United States Patent [19]

Yamada

[11] 4,213,682
[45] Jul. 22, 1980

[54] PROGRAMMED EXPOSURE CONTROL SYSTEM FOR A CAMERA

[75] Inventor: Seiji Yamada, Sakai, Japan

[73] Assignee: Minolta Camera Kabushiki Kaisha, Osaka, Japan

[21] Appl. No.: 968,755

[22] Filed: Dec. 12, 1978

[30] Foreign Application Priority Data

Dec. 27, 1977 [JP] Japan .................. 52/159598

[51] Int. Cl.² .............................................. G03B 7/08
[52] U.S. Cl. ................... 354/23 D; 354/43;
354/38; 354/60 R
[58] Field of Search ............ 354/29, 30, 36, 38,
354/43, 44, 23 D, 50, 51, 31, 60 R

[56] References Cited

U.S. PATENT DOCUMENTS

| 3,641,891 | 2/1972 | Burgarilla | 354/30 X |
| 3,765,311 | 10/1973 | Nobusawa | 354/51 |
| 3,820,131 | 6/1974 | Tanaka | 354/38 |
| 3,821,754 | 6/1974 | Nobusawa | 354/31 X |
| 4,016,574 | 4/1977 | Iwata et al. | 354/23 D X |
| 4,032,935 | 6/1977 | Lermann et al. | 354/29 |
| 4,150,889 | 4/1979 | Ueda et al. | 354/38 X |

FOREIGN PATENT DOCUMENTS 52-46815 10/1976 Japan .

Primary Examiner—L. T. Hix
Assistant Examiner—William B. Perkey
Attorney, Agent, or Firm—Watson, Cole, Grindle & Watson

[57] ABSTRACT

In a photographic camera having programmed automatic exposure control, a light measuring output is produced by measuring scene light and an exposure value signal is generated in response to the light measuring output. A time value and aperture value signal are automatically varied as a function of the changes in the exposure value signal, which function is adapted to be altered in a predetermined manner by the change in the exposure value signal. The aperture size is determined in response to the size in the aperture value signal and the exposure time is determined in accordance with the time value signal.

13 Claims, 4 Drawing Figures

PROGRAMMED EXPOSURE CONTROL SYSTEM FOR A CAMERA

BACKGROUND OF THE INVENTION

1. Field of the Invention

The present invention relates to a photographic camera capable of automatic exposure control, and more particularly to a photographic camera having a programmed automatic exposure control mode.

2. Description of the Prior Art

U.S. Pat. Nos. 3,950,765, 3,964,073 and 4,174,160 each disclose a programmed exposure control system in which the exposure time and F number are both automatically varied in accordance with a linear function when the exposure value changes. Moreover, the constant of the linear function, which is "an incline or gradient of the program", may be adapted to be manually changeable to suit the program to various photographic conditions. Such selectability of the program, however, is rather puzzling to a camera operator who desires a camera to be automatically controlled without any troublesome considerations.

SUMMARY OF THE INVENTION

An object of the present invention is to provide an improved programmed automatic exposure control system for a camera.

Another object of the present invention is to provide a programmed automatic exposure control system applicable to various photographic conditions without manual adjustment or selection.

A further object of the present invention is to provide a novel ideal exposure program for a photographic camera.

According to the present invention, a novel program in which the exposure time and F number are both automatically varied in accordance with a function when the exposure value changes, the function being altered in a predetermined manner by the change in the exposure value.

Programmed exposure control cameras generally control both the f number and exposure time commensurate with the scene brightness, permitting optimum exposure for a wide range of changes in scene brightness. In a single lens reflex camera, however, a lens with a relatively smaller f number, e.g. a minimum f number of F1.4, can be used. The features of such a lens, however, tend to be demonstrated in the minimum to medium f number range. Additionally, such cameras are normally handheld for photographing, with the exposure time selected at 1/60 second or less which causes no blurring. With these considerations taken into account, the primary object of the present invention is to provide an improved programmed exposure control device for use in a camera suitable for any photographic requirements. The device is programmed so that the combination of an f number of F8 and an exposure time of 1/125 second is set for basic photographic conditions, e.g. a person to be photographed under bright sunlight (EV=13 and ASA=100, the film sensitivity which is applied throughout the description hereinafter). The f number and exposure time are altered almost equally for lighter scene brightness, and the f number is altered more than the exposure time for darker scene brightness. The device thus being fitted in a single lens reflex camera as one of the selectable exposure control modes to determine actual exposure time by measuring the light passing through the diaphragm aperture after the aperture has been determined automatically. With the programmed exposure control mode selected by the photographer, exposure is controlled, for normal photography outdoors, in a similar way to the diaphragm aperture or exposure time priority camera, and yet no operation for determining the diaphragm aperture or exposure time beforehand is required, providing high operational and functional efficiency.

DETAILED DESCRIPTION

Figure 1:
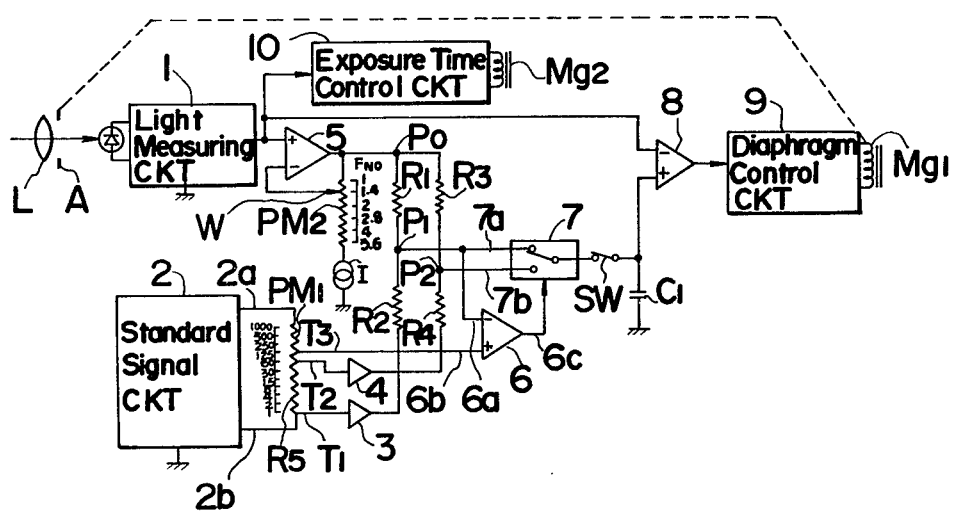
FIG. 1 represents a schematic circuit diagram of a first embodiment of the present invention.

The following is a detailed description of the preferred embodiments of the present invention taken together with the accompanying drawings. Referring to FIG. 1, light measuring circuit 1 receives scene light transmitted through lens L and diaphragm aperture A by photodiode PD and generates a voltage proportional to the logarithm commensurate with the intensity of the received light. At the same time, light measuring circuit 1 photographically adds the above mentioned voltage to a signal representative of the film sensitivity to be used for generating a voltage signal proportional to exposure time Tv (according to the APEX system) commensurate with a diaphragm aperture at the time of light measurement. The light measuring circuit to be used may be of the type described, for example, in U.S. Pat. Nos. 3,977,011 or 4,042,940. Standard signal generating circuit 2 generates a standard signal for exposure time, i.e. a standard signal voltage representative of an exposure time signal, from resistor R5 connected to output terminals 2a and 2b. Standard signal generating circuit 2 includes a constant voltage circuit which produces voltage signals corresponding to exposure times, e.g. 1/1000 second and 1 second respectively from output terminals 2a and 2b. It is to be noted that the output signals from standard signal generating circuit 2 and light measuring circuit 1 are equivalent to each other. Terminals T1, T2 and T3 are connected to the signal output points of resistor R5 corresponding to exposure times of 1 second, 1/60 second and 1/125 second, respectively. Buffer circuits 3 and 4 have high input and low output impedances, respectively, with an output voltage at the same level as the input generated at the output terminals.

Operational amplifier 5, potentiometer PM2 and constant current circuit I together constitute a level shift circuit, which alters the level of the output of light measuring circuit 1, and slider W is set at a position commensurate with the minimum f number of the lens in use. If a lens having a member for transmitting the minimum f number information to a camera body, like the compensating member 4 as described in U.S. Pat. No. 3,896,462, is used, slider W can automatically be positioned. The voltage level raised by the level shift circuit is based on the minimum f number of F1, corresponding to the number of steps of diaphragm aperture values, that is, one step for a lens with a minimum f number of F1.4, two steps for F2 and three steps for F2.8, respectively from F1. Thus, a signal representative of an optimum exposure time for minimum f number F1, at the time of fully open aperture light measurement, is generated from the output terminal of operational amplifier 5 regardless of the minimum f number of the exchangeable lens being used. Resistors R1 and R2 connected in series between the output of operational amplifier 5 and buffer circuit 3 of the level shift circuit constitute a computing means which generates a voltage from a connection point P1, the voltage being obtained by internally dividing both the outputs of operational amplifier 5 and buffer circuit 3 at a resistance ratio of R1:R2. Similarly, resistors R3 and R4 generate a voltage from a connection point P2, the voltage being obtained by internally dividing both the outputs of operational amplifier 5 and buffer circuit 4 at a resistance ratio of R3:R4. In this first embodiment of the present invention, the resistance ratio of R1:R2 is 4:5 and that of R3:R4 is 5:1. Connection points P1 and P2 are connected respectively to input terminals 7a and 7b of changeover switch circuit 7. Furthermore, connection point P1 and terminal T3 are connected to input terminals 6a and 6b of voltage comparator circuit 6. When the voltage at input terminal 6a is higher than that at input terminal 6b, voltage comparator circuit 6 generates a "Low" level voltage signal from output terminal 6c, and when the voltage at terminal 6a is lower, the circuit generates a "High" level voltage signal. Changeover switch circuit 7 is an analog switch such as a multiplexer, using transistors, and when the output level of voltage comparator circuit 6 is "Low", the changeover switch circuit 7 is changed to input terminal 7a, and when the output level is "High", it is changed to input terminal 7b. Switch SW1 is opened at the initial stage of the shutter release operation, i.e. immediately before the diaphragm stopping-down motion is commenced, thus causing a voltage signal at connection point P1 or P2 in a fully open diaphragm aperture condition to be stored by capacitor C1. Voltage comparator circuit 6 and changeover switch circuit 7 together constitute a program selection circuit. Second voltage comparator circuit 8 compares the output signal levels of light measuring circuit 1 and capacitor C1, and when the difference in output signal level reaches a given value, second comparator circuit 8 inverts the output level to thereby operate diaphragm control circuit 9. Electromagnet Mg1 connected to diaphragm control circuit 9 stops the motion of a diaphragm drive member and determines the diaphragm aperture. Exposure time control circuit 10 stores an output signal from light measuring circuit 1 before the reflex mirror starts rising after the diaphragm aperture has been determined, and begins to count exposure time in response to the stored value in association with the shutter opening, thereby operating electromagnet Mg2 upon completion of the exposure time counting to initiate shutter closure. Examples of diaphragm control circuit 9 and exposure time control circuit 10 are disclosed in U.S. Pat. No. 4,042,940.

Figure 2:
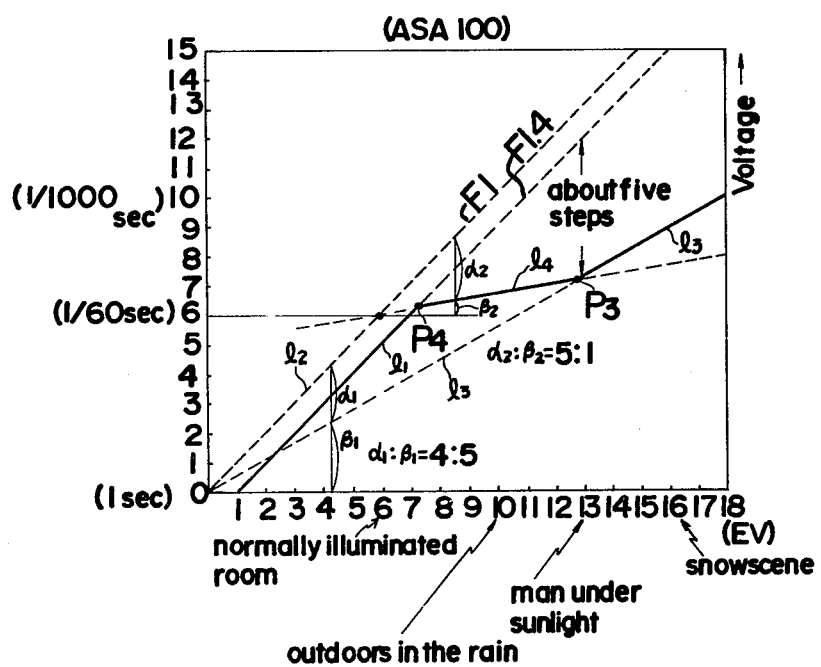
FIG. 2 represents a graphical plot of Tv vs. Ev to show the operation of the FIG. 1 embodiment.

The following is a description of the operation of the circuit in FIG. 1. First, the voltage signal used for a program signal generated from connection point P1 or P2 is described. Assume that a lens having a minimum f number of F1.4 and a film with a sensitivity of ASA100 are used. FIG. 2 illustrates the relationships between the output voltage of light measuring circuit 1, exposure time (Tv) and exposure value (Ev) corresponding to the output voltage in the above assumption. With reference to FIG. 2, straight line 11 represents an output of light measuring circuit 1 for a change in exposure value, and straight line 12 represents an output of the level shift circuit at the output of operational amplifier 5. Additionally, straight lines 13 and 14 represent the output voltages at connection points P1 and P2, respectively. That is, straight line 13 represents the voltage obtained by dividing the voltage difference between the voltage signal from level shift circuit 5 and the voltage signal of Tv=0 from buffer circuit 3 at a ratio of 4:5. Straight line 14 represents the voltage obtained by dividing the voltage difference between the voltage signal from level shift circuit 5 and the voltage signal from buffer circuit 4 at a ratio of 5:1.

For exposure control in the above circuit, the portions shown by solid lines of the respective straight lines 11, 14 and 13 are utilized in the following manner. When input terminal 6b (T3) of voltage comparator circuit 6 is set to a position where a signal of exposure time (near Tv=7) corresponding to an intersection P3 of straight lines 13 and 14 is generated, a signal at connection point P1, i.e. that shown by the solid line of straight line 13 is given by the output from voltage comparator circuit 6 to capacitor C1 in the exposure time range shorter than that of intersection P3. In the exposure time range longer than that at intersection P3, however, a signal shown by straight line 14 on the left side of intersection P3 is given to capacitor C1. Such a signal is stored in capacitor C1 through opening switch SW in the initial stage of the shutter release operation immediately before the diaphragm is stopped-down. Then, the diaphragm stopping-down motion commences. If the exposure value is greater than that corresponding to that of intersection P4, the diaphragm is to be stopped-down toward a smaller aperture size, in response to which the output level of light measuring circuit 1 declines, and when the output level coincides with straight line 13, the output level of second voltage comparator circuit 8 is inverted to operate electromagnet Mg1, whereby the diaphragm stopping-down motion is stopped to thereby determine the diaphragm aperture. In the case of a brightness with the exposure value being Ev=13, the diaphragm is stopped-down by approximately five steps from the minimum f number of F1.4 and is determined to be F8. In the range where an exposure value is smaller than that corresponding to that of intersection P4, the output of second voltage comparator circuit 8 is inverted before the diaphragm is stopped-down. Therefore, if diaphragm control circuit 9 is made operative when the shutter release operation is initiated by the shutter release button, electromagnet Mg1 immediately operates to stop the diaphragm stopping-down motion, whereby the diaphragm is determined to be in a fully open condition. The output of light measuring circuit 1 is stored in exposure time control circuit 10 before the mirror is lifted after the diaphragm aperture has thus been determined, and in association with the shutter opening, counting is carried out for a time commensurate with the stored value, and after a lapse of time commensurate with the stored value, electromagnet Mg1 operates to initiate shutter closure, whereby exposure is terminated. The operation of the lens whose minimum f number is F1.4 has been described. In the case of a lens whose minimum f number is different, however, straight line 11 in FIG. 2 alone moves in a parallel direction, with straight lines 14 and 13 remaining unmoved. Therefore, when the diaphragm aperture is determined to be any other value than the minimum f number, the diaphragm aperture and exposure time are always commensurate with the scene brightness. If an optimum diaphragm aperture is smaller than the maximum f number, it is apparent that the diaphragm aperture becomes the maximum f number and only the exposure time is changed.

Thus, a programmed exposure control device according to the present invention has the following features. Even when a lens with a different minimum f number is used, the same exposure time and diaphragm aperture are available for the same exposure value. Furthermore, no setting operation is required by a photographer who only has to perform the shutter release operation for general photography because the device is so programmed that exposure time and diaphragm aperture which would be generally set by a photographer on a camera of a manual setting type are automatically determined for comparatively brighter scenes, and that the exposure time is kept within the range which would cause no hand blur and the diaphragm aperture is made widely open to prevent blurring for comparatively darker scenes so as to make use of most of the features of a single lens reflex camera. In the embodiment of the present invention, a method wherein the diaphragm stopping-down motion is stopped when the diaphragm is stopped-down to an optimum diaphragm aperture is employed to determine the diaphragm aperture. However, another method in which a voltage signal between the output of light measuring circuit 1 and capacitor C1 is transferred to a meter and the diaphragm aperture is determined in response to the swing angle of the meter needle, for example, may also be employed. It is also easy to employ as a substitute for exposure time control circuit 10 a method in which light reflected from the surface of a film under exposure is measured to determine exposure time.

Figure 3:
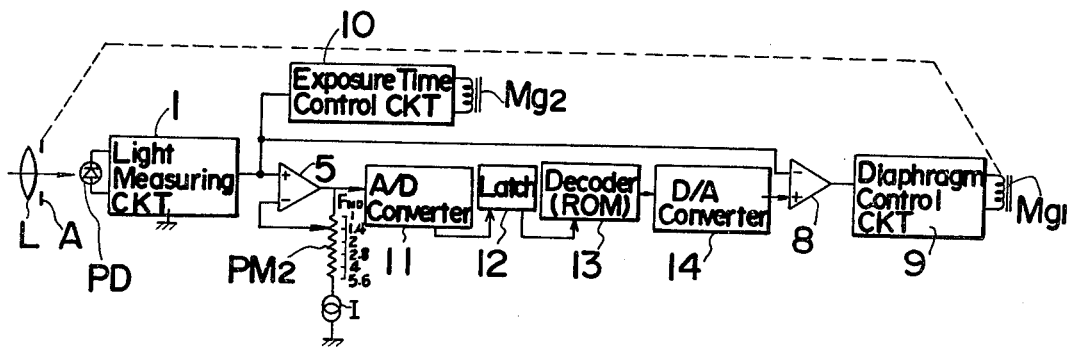
FIG. 3 represents a schematic circuit diagram of a second embodiment of the present invention.

FIG. 3 is a block circuit diagram of a second embodiment according to the present invention. In this circuit, a program signal as the function of an exposure value Ev is formed using digital circuit technology. It should be noted that the same designations are used for circuit components corresponding to FIG. 1. The difference in the circuitry between FIGS. 1 and 3 resides in the construction of a program signal generating portion located between the output terminal of level shift circuit 5 and the input terminal of voltage comparator circuit 8.

In FIG. 3, analog-digital converter circuit 11 converts the analog voltage signal from level shift circuit 5 to a digital signal. Latch circuit 12 performs a latching of the digital signal from the analog-digital converter circuit 11 in the initial stage of the shutter release operation immediately before the diaphragm is stopped-down, and holds a signal commensurate with a light measurement output when the diaphragm aperture A is fully open. Decoder 13 consists of a ROM (Read-Only Memory), for example, and generates the signal written in the address designated by the address signal in accordance with the output of latch circuit 13.

The number of ROM 13 addresses, in this case, can be made equal to 48 by dividing the exposure values from Ev=6 to Ev=18, for example, into forty-eight steps by a ¼ step unit. With the construction of digital-analog converter circuit 14 taken into account so that program signals shown by the graph in FIG. 2 and commensurate with the respective exposure values are generated at these forty-eight addresses, the address contents are determined.

Digital-analog converter circuit 14 converts the digital signal of decoder 13 to an analog signal. Information to be written in ROM 13 is predetermined so that signals corresponding to the program signals shown by the solid line of straight line 13 as well as by the left side portion of intersection P3 on straight line 14 in the graph of FIG. 2 are provided. In this case, as digital-analog converter circuit 14, the digital-analog converter circuit included in analog-digital converter circuit 11 may be used.

The operation of the above circuit is as follows. When the shutter release operation is performed, the output of level shift circuit 5 immediately before the diaphragm is stopped-down is held in latch circuit 12 as a digital signal. The content of ROM 13 assigned by the output of latch circuit 12 as an address signal is then read and is input to digital-analog circuit 14, and the analog voltage as a program signal of digital-analog converter circuit 14 is input to second voltage comparator circuit 8. The operation hereinafter is done in a similar manner to the circuit shown in FIG. 1. It should be understood that a latch circuit may be provided between decoder 13 and digital-analog converter circuit 14 to latch the decoder output.

Figure 4:
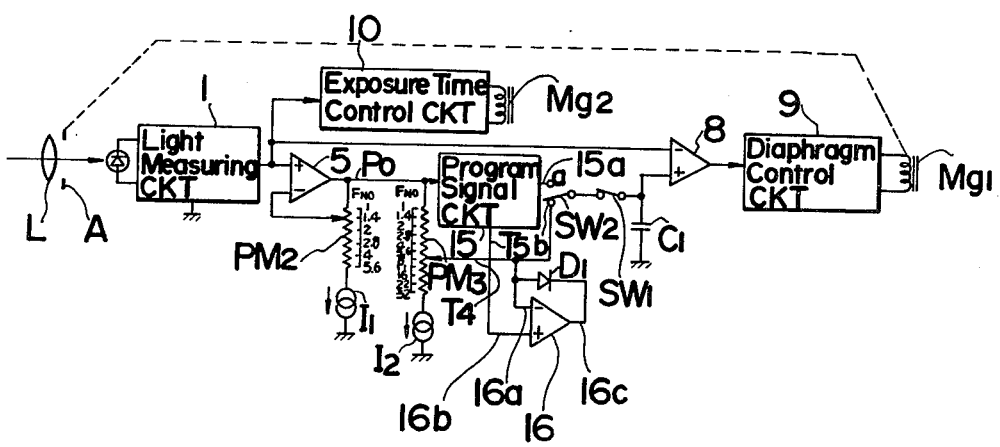
FIG. 4 represents a schematic circuit diagram of a third embodiment of the present invention.

FIG. 4 is a modified circuit with potentiometer PM3, constant current circuit I2, operational amplifier 16, diode D1 and changeover switch SW2 added to the circuit in FIG. 1. Program signal circuit 15 corresponds to that of the program signal generating portion composed of elements 2, PM, R1, R2, R3, R4, 6 and 7 in FIG. 1, and output 15a of program signal circuit 15 corresponds to that of switch circuit 7 in FIG. 1. Slider T4 of potentiometer PM3 is associated with a diaphragm aperture presetting dial provided on the camera body (not shown). Changeover switch SW2 is changed to contact a for the aforesaid programmed operation and is changed to contact b for the diaphragm aperture priority mode to be described below. With the additional circuitry, the diaphragm aperture of a lens can be determined with priority by a diaphragm presetting means provided on the camera body. As described earlier, an optimum exposure time signal for an aperture F1 is generated from level shift circuit 5. Slider T4, when set to any diaphragm aperture value indicated at the side of potentiometer PM3, generates a signal lower in level than the output signal of level shift circuit 5 by the number of steps of diaphragm aperture values from diaphragm aperture F1 to the set diaphragm aperture. That is, an optimum exposure time signal commensurate with the preset diaphragm aperture value. This signal is input through switch SW2 to memory capacitor C1, and when the shutter release operation is performed, switch SW1 is opened, causing the signal to be held, and diaphragm aperture A is determined afterward by the same operation as described above. In case the signal from slider T4 is representative of a shorter exposure time than the output limit of exposure time, e.g. 1/1000 second, a voltage corresponding to an exposure time of 1/1000 second is input to memory capacitor C1 by a circuit comprising operational amplifier 16 and diode D1. That is, terminal T5 from circuit 15 is connected to positive input terminal 16b of operational amplifier 16 and is coupled to the position where a signal corresponding to 1/1000 second of potentiometer PM1 in FIG. 1 is generated. And if the voltage level at negative input terminal 16a of operational amplifier 16 is lower in level than a signal voltage commensurate with an exposure of 1/1000 second, output terminal 16c of operational amplifier 16 becomes a positive potential, thus causing negative input terminal 16a to be unaffected. With the relations between the above two input signals reversed, however, the output level of operational amplifier 16 decreases, whereby the level at negative input terminal 16a is lowered to that of positive input terminal 16b, i.e. a signal level of 1/1000 second. When the diaphragm aperture preset by the aforesaid operation is inappropriate, the diaphragm is stopped-down to an appropriate value, the optimum exposure thus being guaranteed. It may be easy to construct a circuit having a similar function to the circuitry added in FIG. 4 by using a digital circuit and to apply it to the circuit in FIG. 3.

As described above, a programmed exposure control device according to the present invention wherein both the exposure time and diaphragm aperture commensurate with the scene brightness can be determined automatically, permits the same program available even for the different minimum f numbers of lenses, the exposure time and diaphragm aperture being set to the program features matching the characteristics of a single lens reflex camera. That is, the exposure time and diaphragm aperture are combined in the ranges of F8 to F16 and 1/125 second to 1/1000 second for relatively brighter scenes (in photography under sunlight), while the exposure time is kept within the range which causes no hand blur and the diaphragm aperture is more widely open for relatively darker scenes. For normal photography, therefore, no diaphragm aperture and exposure time settings are required, and depressing the shutter button alone enables photography with optimum exposure commensurate with a wide range of changes in scene brightness and without any hand blur.

What is claimed is:

1. A photographic camera capable of programmed automatic exposure control comprising:
    means for measuring light to produce a light measuring output;
    means for producing an exposure control signal in response to the light measuring output;
    means for automatically varying both the time value signal and aperture value signal as a first function of the magnitude of the exposure control signal when said magnitude is in a first range of exposure control signal magnitudes, and as a second function of the magnitude of the exposure control signal when said magnitude is in a second range of exposure control signal magnitudes;
    means for determining the aperture size in response to the aperture value signal; and
    means for determining the exposure time in response to said time value signal.

2. A photographic camera as in claim 1, wherein said second range of exposure control signal magnitude is lower than the exposure control signal magnitudes in said first range.

3. A photographic camera as in claim 2, wherein the ratio of change of said time value signal to that of said aperture value signal is greater in said first function than in said second function.

4. A photographic camera as in claim 3, wherein said first function is a first linear function with a first constant and the second function is a second linear function with a second constant.

5. A photographic camera as in claim 4 further comprising first means for determining the first linear function, second means for determining the second linear function, and means for automatically selecting one of said first and second determining means in response to the exposure control signal.

6. A photographic camera as in claim 3, wherein said automatically varying means includes means for storing various program signals corresponding to various magnitudes of the exposure control signal, and means for selecting one of said program signals in response to the exposure control signal generated by said means for producing.

7. A photographic camera as in claim 3, wherein said light mesuring means is adapted to produce the light measuring output by means of fully open aperture measurement, and said means for producing includes means for setting the fully open aperture size to produce the exposure control signal and means to compensate the exposure control signal to account for different fully open aperture sizes.

8. A photographic camera as in claim 3, wherein said automatically varying means includes means for producing said aperture value signal as a function of said exposure control signal, and means for producing said time value signal as a function of said aperture value signal.

9. A photographic camera capable of programmed automatic exposure control comprising:
    means for measuring light through the diaphragm aperture to produce a light measuring output;
    means for producing an exposure control signal in response to the light measuring output;
    first means for generating a first signal from said exposure control signal and a first reference signal;
    second means for generating a second signal from said exposure control signal and a second reference signal;
    means for selecting one of said first and second signals in accordance with said exposure control signal to control the exposure.

10. A photographic camera as in claim 9 further comprising means for determining an aperture size of the diaphragm aperture as a function of a difference between said light measuring output and the selected one of said first and second dividing signals.

11. A photographic camera as in claim 10 further comprising means for determining the exposure time in response to the light measuring signal with the diaphragm aperture determined.

12. A photographic camera as in claim 9 wherein said first means includes a first means for dividing said exposure control signal and said first reference signal at a first ratio, and said second means includes second means for dividing said exposure control signal and said second reference signal at a second ratio.

13. A photographic camera capable of programmed automatic exposure control comprising:
    means for measuring light through the diaphragm aperture to produce a light measuring output;
    means for producing an exposure control signal in response to the light measuring output;
    means for converting said exposure control signal into a digital exposure control signal;
    means for selecting one of a plurality of digital program signals stored therein in response to said digital exposure control signal;
    means for converting the selected one of said digital program signals into an analog program signal; and
    means for determining the aperture size of the diaphragm aperture in response to a difference between said light measuring output and said analog program signal.

* * * * *